United States Patent [19]
Santin et al.

[11] Patent Number: 5,815,026
[45] Date of Patent: Sep. 29, 1998

[54] HIGH EFFICIENCY, HIGH VOLTAGE, LOW CURRENT CHARGE PUMP

[75] Inventors: Giovanni Santin; Giulio Marotta, both of Rieti, Italy; Michael C. Smayling, Missouri City, Tex.

[73] Assignee: Texas Instruments Incorporated, Dallas, Tex.

[21] Appl. No.: 684,607

[22] Filed: Jul. 19, 1996

[51] Int. Cl.[6] .............................. H02M 3/18; H02M 7/00
[52] U.S. Cl. .......................... 327/536; 327/535; 327/566; 327/564; 327/589; 327/390; 327/534; 307/110; 363/59
[58] Field of Search ..................................... 327/534, 535, 327/536, 564, 565, 566, 567, 438, 439, 390, 589; 307/110; 363/59, 60; 257/373, 372

[56] References Cited

U.S. PATENT DOCUMENTS 5,625,544  4/1997  Kowshik et al. ....................... 327/536

Primary Examiner—Timothy P. Callahan
Assistant Examiner—Dihn T. Le
Attorney, Agent, or Firm—J. Dennis Moore; James C. Kesterson; Richard L. Donaldson

[57] ABSTRACT

An integrated circuit voltage multiplier 30 in a semiconductor substrate of a first conductivity type. The multiplier includes a diode 22, having a first voltage VDD applied to a first port thereof, the diode being made of: 1) a first well 12 of a second conductivity type formed in the substrate, being connected to a second voltage VB; 2) a second well 14 of the first conductivity type formed in the first well, having an electrical contact point comprising the first port of the diode; and 3) a third well 16 of the second conductivity type formed in the second well, having an electrical contact point comprising a second port of the diode. The multiplier also includes a capacitor C3, having a first contact thereof connected to the second port of the diode and having a third, pulsed voltage PH1 connected to a second contact of the capacitor. The second voltage has a value of the first voltage or higher, such that the emitter-base junction of a parasitic transistor 20 formed by the substrate, the first well and the second well is not forward biased, and wherein the third, pulsed voltage drives the second port of the diode to a voltage of a level of the first voltage, less the forward bias voltage drop of the diode, plus the level of the third voltage.

3 Claims, 2 Drawing Sheets

HIGH EFFICIENCY, HIGH VOLTAGE, LOW CURRENT CHARGE PUMP

This application claims benefit of USC provisional application Ser. No. 60/001,508, filed Jul. 19, 1995.

TECHNICAL FIELD OF THE INVENTION

This invention relates to integrated circuits, and more particularly relates to a high efficiency, high voltage, low current charge pump circuit.

BACKGROUND OF THE INVENTION

Integrated circuits, or ICs, are typically provided with a single supply voltage, VDD, off of which the entire circuit operates. However, some circuits, such as Flash memories and EEPROMs need higher voltages than VDD, for example for programming and erasure of the memory cells thereof. This requirement has been met by the provision of an outside source of higher voltage. However, it is desired to have an IC that has only a single supply requirement. Accordingly, efforts have been made to generate the higher voltage internally to the IC.

A typical prior art implementation, shown in FIG. 1a and 1b, has used poly-poly or poly-moat capacitors, and N-channel MOSFETS, wired as diodes, as rectifiers. Clocks F1 and F2, being pulsed at VDD, are applied to one electrode of capacitors C1 and C2, as shown in FIG. 1a, the other electrode thereof being connected to nodes M and N, respectively. The relative phase relationship of clocks F1 and F2 is shown in FIG. 1b. As clock pulses of successive phase are applied to their associated capacitors, the voltage developed at the node on the other side of that capacitor is equal to the voltage developed at the node of the preceding stage, minus the threshold voltage, Vt, of the MOS diode coupling that voltage to the present stage, plus the VDD of the clock. Thus, voltage is multiplied. For example, assuming VDD was developed at node L, when clock F1 is applied a maximum voltage of VDD+VDD−Vt is developed at node M. Upon application of clock F2, a maximum voltage of VDD+VDD+VDD−Vt−Vt is developed at node N, and so forth.

However, this implementation has relatively poor efficiency due to the large voltage drops at the higher voltage stages, due to "body effect." Body effect is the increase in the Vt of the device as the voltage difference between the source and back gate of the device increases.

The circuit can be refined by adding two auxiliary clocks and using the "bootstrapping" technique, in which the higher voltages of later stages are applied to the gates of earlier stages to enhance voltage transfer through the devices, but the efficiency of the resulting circuit still suffers from the body effect of the MOS devices, especially in the later stages. In addition, the body effect limits the minimum working supply voltage, since the voltage swing at node M or node N is limited to VDD−Vt.

All of these disadvantages are greater for a voltage multiplier generating negative voltages and using P-channel devices, because it is necessary to start from VDD and to pump the voltage in the negative direction. In addition, as supply voltage decreases, which is a trend in modern integrated circuit development, the limits imposed by body effect become even more problematic.

The present invention avoids these problems.

SUMMARY OF THE INVENTION

According to the present invention there is provided a voltage multiplier constructed in conjunction with a semiconductor substrate of a first conductivity type. The multiplier includes a diode wherein the diode is fabricated from a first well of a second conductivity type formed in the substrate, a second well of the first conductivity type formed in the first well, having an electrical contact point which is the first port of the diode for connection to a first voltage, and a third well of the second conductivity type formed in the second well, having an electrical contact point which is a second port of the diode and the output port of said voltage multiplier. Also included is a capacitor, having a first contact thereof connected to the second port of the diode and having a second contact for connection to a second, pulsed voltage.

According to another aspect of the present invention there is provided an integrated circuit voltage multiplier in a semiconductor substrate of a first conductivity type. The multiplier includes a diode, having a first voltage applied to a first port thereof, the diode being made of a first well of a second conductivity type formed in the substrate, being connected to a second voltage, a second well of the first conductivity type formed in the first well, having an electrical contact point comprising the first port of the diode, and a third well of the second conductivity type formed in the second well, having an electrical contact point comprising a second port of the diode. The multiplier also includes a capacitor having a first electrode thereof connected to the second port of the diode and having a third, pulsed voltage connected to a second electrode of the capacitor. The second voltage has a value of the first voltage or higher, such that the emitter-base junction of a parasitic transistor formed by the substrate, the first well and the second well is not forward biased, and wherein the third, pulsed voltage drives the second port of the diode to a voltage of a level of the first voltage, less the forward bias voltage drop of the diode, plus the level of the third voltage.

These and other features of the invention that will be apparent to those skilled in the art from the following detailed description of the invention, taken together with the accompanying drawings.

DESCRIPTION OF THE DRAWINGS

FIG. 1b is a timing diagram of the two clock signals used in the circuit of FIG. 1a;

FIG. 2b is a schematic diagram of the elements shown in FIG. 2a;

DETAILED DESCRIPTION OF THE INVENTION

The preferred embodiment of the present invention is implemented as a voltage multiplier capable of generating positive voltages using insulated PN junction diodes. It advantageously utilizes a deep N-well process such that an insulated PN junction is used as a diode to transfer electrical charge between the nodes of a charge multiplier. This diode can be used in circuits capable of generating positive voltages. Since an actual diode PN junction is used, rather than a MOS device wired as a rectifier, the limitations of body effect are not present to impair the performance of the voltage multiplier.

Figure 2A:
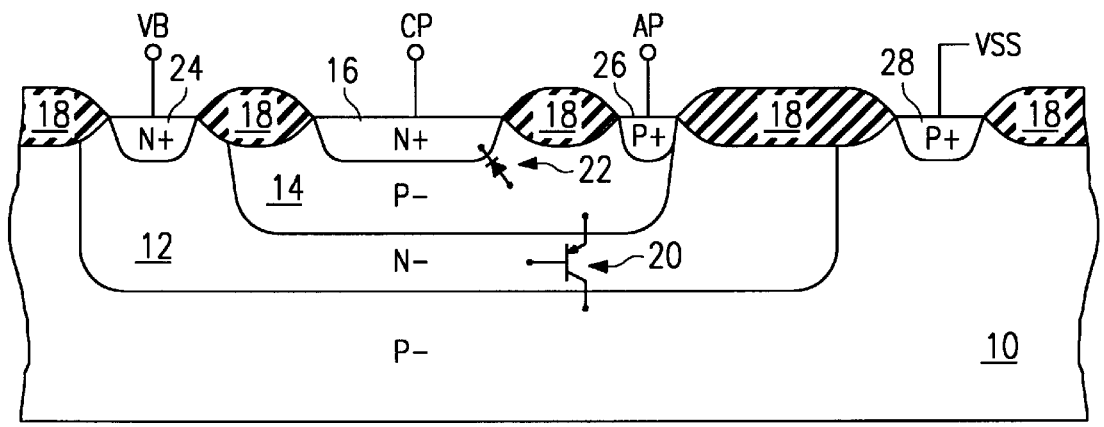
FIG. 2a is a cross section view of a portion of a semiconductor device, showing basic elements used in the preferred embodiment of the present invention.
Figure 2B:
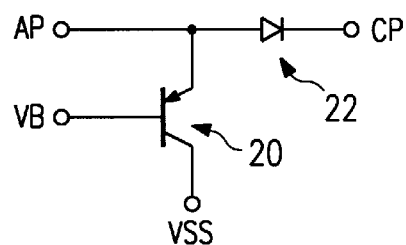

FIG. 2a is a cross section through a semiconductor substrate showing the basic elements of which the preferred embodiment is built. FIG. 2b shows the equivalent schematic for the elements shown in FIG. 2a. FIG. 2a shows a P− semiconductor substrate 10 in which a deep N− well 12 has been diffused. In the deep N− well 12 a P− well 14 has been diffused. An N− region 16, electrically, node CP, has been diffused into the P− well 14. Preferably: the N− region 16 has a dopant density of approximately $10^{20}$ atoms/cm$^3$, and a depth of approximately 0.3 mm; the P− well 14 has a dopant density of approximately $3 \times 10^{16}$ atoms/cm$^3$, and a depth of approximately 1.5 mm; and the N− well 12 has a dopant density of approximately $8 \times 10^{15}$ atoms/cm$^3$, and a depth of approximately 7 mm. Regions of oxide 18 are formed by a conventional LOCOS process on the surface of substrate 10. The substrate 10, the deep N− well 12 and the P− well 14 together form the collector, emitter and base, respectively, of a bipolar transistor 20, which is depicted by symbol superimposed on the view, as well as being shown in FIG. 2b. A diode 22 is formed by the junction of the N+ diffusion 16 and the P− diffusion 14, the cathode port CP being the N+ diffusion 16 and the anode port AP being the P− diffusion 14. The N+ diffusion 24 provides an electrical contact region for the N− well 12, while the P+ diffusion 26 provides an electrical contact region, electrically, node AP, for the P− well 14 and the P+ diffusion 28 provides an electrical contact region for the substrate 10. It will be noted that the preferred well ion densities and depths described in this paragraph, inter alia, result in a relatively wide parasitic transistor 20 base, thereby lowering the beta of the transistor 20, while also aiding in supporting the higher voltages in the P− diffusion 14 generated in the later stages of a voltage multiplier comprised of the structure shown in FIG. 2a.

The N− tank 12 must be connected to a voltage, VB, higher than or equal to the voltage of the P− well (node AP), in order to avoid forward biasing the emitter-base junction of the transistor 20 to thereby prevent turning on the parasitic bipolar transistor 20. Vss is the term for the voltage applied to the substrate, which is ground.

Figure 3:
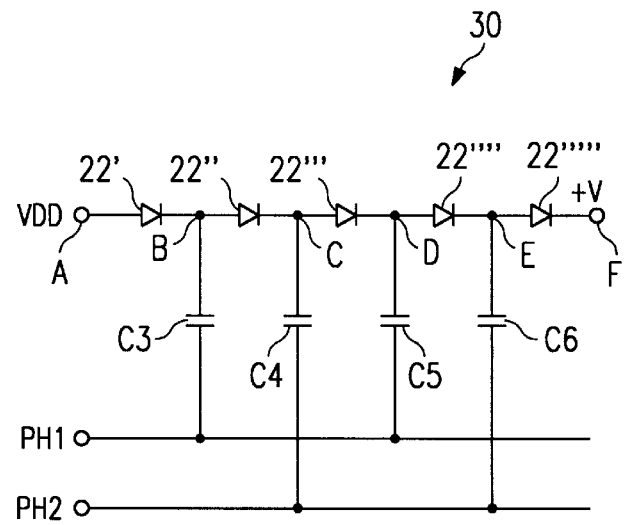
FIG. 3 is a schematic diagram of the charge pump of the preferred embodiment of the present invention.

FIG. 3 is a circuit diagram showing a positive voltage multiplier 30, utilizing the basic elements depicted in FIGS. 2a and 2b. The multiplier 30 is made of five diodes 22', 22", 22"', 22"", 22""', each constructed from a diode 22 structure like that shown in FIG. 2a, connected serially, as shown, resulting in six nodes, A, B, C, D, E, and F. VDD is applied to node AP, while +V, the multiplied, output voltage is provided on node F. Capacitors C3 and C5 connect Φ1 to nodes B and D, respectively, while capacitors C4 and C6 connect Φ2 to nodes C and E, respectively. Note that the parasitic transistors 20 created with the formation of diodes 22, as explained hereinabove in connection with FIGS. 2a and 2b, are not shown in FIG. 3a. It will be understood that these transistors 20 are present, but because in operation the voltage VB is applied to the bases thereof, as explained hereinabove, they are turned off, and therefore do not affect the operation of multiplier 30.

Note that diode 22' and capacitor C3 form the first of four stages of multiplier 30. The second, third and fourth stages are formed by diode 22" and capacitor C4, diode 22"' and capacitor C5, and diode 22"" and capacitor C6, respectively. The fifth diode 22""' is a blocking diode to prevent current leaking back into the multiplier 30 as the voltage on node E may fall, compared to output node F. Each of the four stages provides a voltage multiplication function, as will now be described.

Figure 1A:
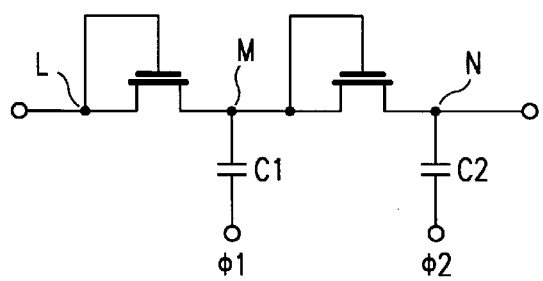
FIG. 1a is a schematic diagram of a prior art charge pump.
Figure 1B:
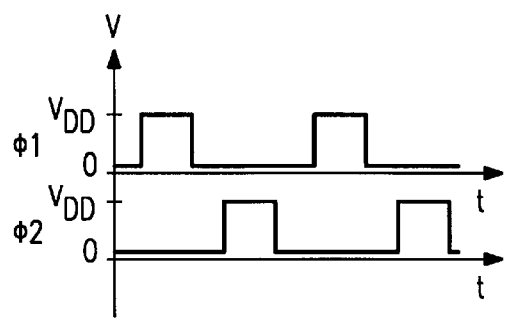

Voltage boost is generated in a four stage operation as follows. Note initially, however, that, as shown in FIG. 1b, Φ1 and Φ2 are pulsed signals having less than 50% duty cycles (i.e., pulse duration is less than a half the pulse period) and a voltage magnitude of VDD, that are 180° out of phase from one another. Voltage VDD is applied to node A, resulting in a voltage of VDD−VFB at node B, with VFB being the forward bias voltage drop across a diode, such as the diode 22', i.e., about 0.7 volts. Then, Φ1 is pulsed positive to VDD (FIG. 1b). This drives node B to VDD+VDD−VFB, being the result of the multiplication by the first stage. This, in turn, drives node C of the second stage to VDD+VDD−VFB−VFB, or 2VDD−2VFB. Then, Φ2 is pulsed positive to VDD (FIG. 1b). This drives node C to 3VDD−2VFB, and node D of the third stage to 3VDD−3VFB. Likewise, after Φ1 and Φ2 pulse again node D is driven to 4VDD−3VFB, node E of the fourth stage to 5VDD−4VFB, and node F to 5VDD−5VFB, the final, multiplied, output voltage +V.

However, note that across the several stages of multiplier 30, VFB remains at about 0.7 volts, without any "build up" of body effects to decrease the multiplying effect of the voltage multiplier 30. Also note that while only four boost stages are shown in FIG. 3a, more or fewer stages may be used, as desired, resulting in more or less voltage multiplication, respectively.

Figure 4:
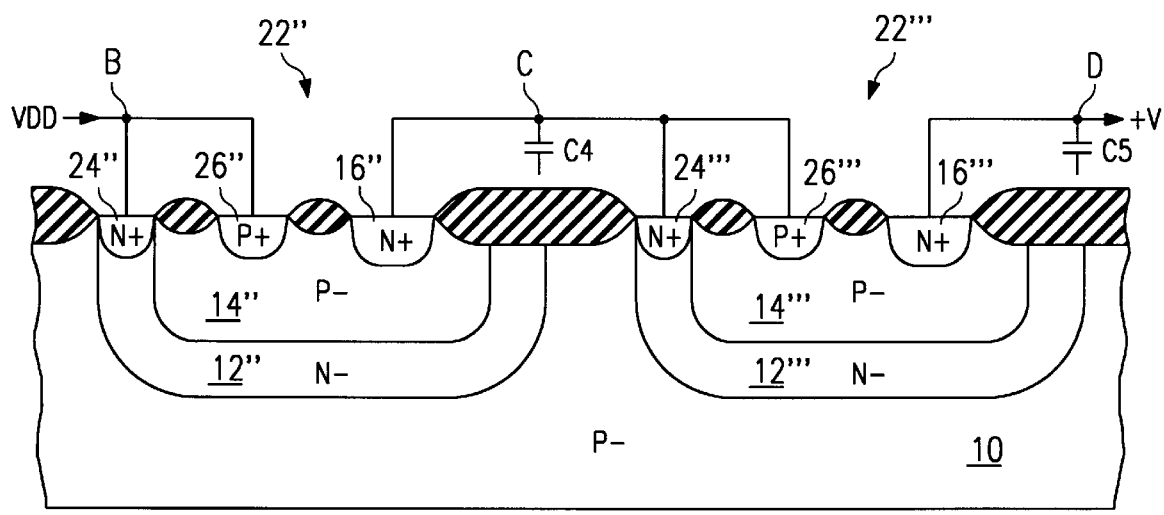
FIG. 4 is a cross sectional diagram through a semiconductor substrate showing a portion of the preferred embodiment of the present invention.

FIG. 4 is a cross section through a semiconductor substrate showing the physical relationship in a substrate 10 of two adjacent diodes 22", 22"', of FIG. 3a. Features of diodes 22", 22"', corresponding to features of the diode 22 identified and discussed in connection with FIG. 2a, are shown as primed values, for example deep N− well 12" and P− well 14" in diode 22" (FIG. 4) corresponding to deep N− well 12 and P− well 14 in diode 22 (FIG. 2a). Electrical nodes B, C and D and capacitors C4 and C5 (FIG. 3) are depicted in FIG. 4, to show electrical connection points to the structures of diodes 22", 22"'. It will be noted that capacitors C4 and C5, as well as capacitors C3 and C6 (FIG. 3a), are formed using conventional techniques, for example by depositing a polysilicon 1 layer over a field oxide region, such as region 18 in FIG. 2a, depositing silicon oxide over that, and then depositing a polysilicon 2 layer over that silicon oxide layer, with connection being made of both polysilicon layers to appropriate metallization wires.

Although the present invention and its advantages have been described in detail in conjunction with preferred embodiments, it should be understood that various changes, substitutions and alterations can be made herein without departing from the spirit and scope of the invention as defined by the appended claims. For example, while the embodiments described hereinabove may be used to generate a positive multiplied voltage, the principles of the present invention can be advantageously applied in similar manner to generate negative voltages. Isolation wells and other doped regions of opposite conductivity type to those shown, e.g. in FIGS. 2a and 4, are used to generate negative voltages. Otherwise, the principles applied to fabricate such a voltage multiplier are the same as described above.

What is claimed is:

1. A voltage multiplier, comprising:

a semiconductor substrate of a first conductivity type;

a diode, having a first voltage applied to a first port thereof, said diode comprising:

a first well of a second conductivity type formed in said substrate, being connected to a second voltage, a second well of said first conductivity type formed in said first well, having an electrical contact point comprising said first port of said diode, and a third well of said second conductivity type formed in said second well, having an electrical contact point comprising a second port of said diode; and a capacitor, having a first contact thereof connected to said second port of said diode and having a pulse signal voltage at a third voltage connected to a second contact of said capacitor;

wherein said second voltage has a value of said first voltage or higher, such that the emitter-base junction of a parasitic transistor formed by said substrate, said first well and said second well is not forward biased, and wherein said pulsed signal drives said second port of said diode to said first voltage, minus the forward bias voltage drop of said diode, plus said third voltage.

2. A voltage multiplier, comprising:

a semiconductor substrate of a first conductivity type;

a plurality, n, of diodes connected in series from a first diode to a last diode, each of said diodes comprising a first well of a second conductivity type formed in said substrate, being connected to a first voltage, a second well of said first conductivity type formed in said first well, having an electrical contact point comprising said first port of said diode, and a third well of said second conductivity type formed in said second well, having an electrical contact point comprising a second port of said diode, the first of said diodes in said series having a second voltage applied to the first port thereof, with the first port of the second of said diodes in said series being connected to the second port of the first diode in said series, and the first port of the other of said diodes in said series being connected to the second port of the previous diode in said series, forming a series of n−1 stages; and n−1 capacitors, each having a first contact thereof connected one of the interconnection points of said diodes, and having a second contact thereof connected, alternatingly, to one of a first pulsed signal and a second, pulsed signal, said first pulsed signal being pulsed cyclically to a third voltage during a first phase, and said second pulsed signal being pulsed cyclically to a fourth voltage during a second phase that alternates with said first phase;

wherein said first voltage has a value of said second voltage or higher, such that the emitter-base junction of a parasitic transistor associated with each of said diodes, formed by said substrate, said first well and said second well, is not forward biased, and wherein said first pulsed signal drives said second port of the first of said diodes to said first voltage, minus the forward bias voltage drop of said diode, plus said third voltage, and wherein voltage levels at succeeding interconnection points of said diodes are alternatively driven by said first pulsed signal or said second pulsed signal.

3. A voltage multiplier, comprising:

a semiconductor substrate of a first conductivity type; and a plurality, n, of multiplier stages, each stage comprising
a diode, said diode comprising
a first well of a second conductivity type formed in said substrate, being connected to a first voltage,
a second well of said first conductivity type formed in said first well, having an electrical contact point comprising a first port of said diode, and
a third well of said second conductivity type formed in said second well, having an electrical contact point comprising a second port of said diode, and
a capacitor, having a first contact thereof connected to said second port of said diode, and having a second contact;

said stages being connected serially, diode to diode, such that the first port of each stage, except the first stage, is connected to the second port of a preceding stage and the second electrical contact point of each stage, except the last stage, is connected to the first electrical contact point of a succeeding stage, the second contact of said capacitors of each stage being connected, alternatingly, to one of a first pulsed signal and a second pulsed signal, said first pulsed signal being pulsed cyclically to a third voltage during a first phase, and said second pulsed signal being pulsed cyclically to a fourth voltage during a second phase that alternates with said first phase;

wherein a second voltage is applied to the first port of the diode in said first stage, and wherein said first voltage has a value of said second voltage, or higher, such that the emitter-base junction of a parasitic transistor associated with each of said diodes, formed by said substrate, said first well and said second well, is not forward biased, and wherein said first pulsed signal drives said second node of said diode to said first voltage, minus the forward bias voltage drop of said diode, plus said third voltage, and voltage levels at succeeding interconnection points in the serially connected stages are alternatively driven by said first pulsed signal or said second pulsed signal.

* * * * *